United States Patent

Musale et al.

(10) Patent No.: US 9,199,594 B2
(45) Date of Patent: Dec. 1, 2015

(54) SYSTEM, METHOD, AND APPARATUS FOR AUTOMOTIVE UNDER-RUN PROTECTIVE DEVICE

(71) Applicant: Tata Technologies Pte Ltd, Singapore (SG)

(72) Inventors: Gopal Musale, Maharashtra, IN (US); Jagat Pattnaik, Maharashtra, IN (US); Aniket Katti, Maharashtra, IN (US); Shiva Hanchinhal, Maharashtra, IN (US); Subhendu Ghosh, Maharashtra (IN)

(73) Assignee: TATA TECHNOLOGIES PTE LTD, Singapore (SG)

( * ) Notice: Subject to any disclaimer, the term of this patent is extended or adjusted under 35 U.S.C. 154(b) by 47 days.

(21) Appl. No.: 14/028,192

(22) Filed: Sep. 16, 2013

(65) Prior Publication Data

US 2015/0076846 A1    Mar. 19, 2015

(51) Int. Cl.
*B60R 19/02*    (2006.01)
*B60R 19/56*    (2006.01)

(52) U.S. Cl.
CPC ...................................... *B60R 19/56* (2013.01)

(58) Field of Classification Search
CPC ........... B65D 2519/00019; B65D 2519/00051; B65D 2519/00273; B65D 2519/00288; E01F 15/143; G06F 21/86; G06F 21/00; H01L 2224/16225; H01L 2224/32225; H01L 2224/73204
USPC ................. 293/183.2, 133; 256/13.1; 52/840; 296/187.03
See application file for complete search history.

(56) References Cited

U.S. PATENT DOCUMENTS

| 4,221,413 | A | * | 9/1980 | Bonnetain | 293/122 |
| 4,329,824 | A | * | 5/1982 | Lowe | 52/634 |
| 4,409,771 | A | * | 10/1983 | Lowe | 52/840 |
| 4,468,052 | A | * | 8/1984 | Koike | 280/784 |
| 4,966,378 | A | * | 10/1990 | Cook | 280/154 |
| 5,252,002 | A | * | 10/1993 | Day | 405/126 |
| 5,632,518 | A | * | 5/1997 | Kendall | 293/103 |
| 6,089,629 | A | * | 7/2000 | Hope et al. | 293/132 |
| 6,179,355 | B1 | * | 1/2001 | Chou et al. | 293/132 |
| 6,390,438 | B1 | * | 5/2002 | McManus | 249/19 |
| 6,398,275 | B1 | * | 6/2002 | Hartel et al. | 293/102 |
| 6,435,579 | B1 | * | 8/2002 | Glance | 293/155 |
| 6,652,010 | B1 | * | 11/2003 | Huddle et al. | 293/102 |
| 6,712,411 | B2 | * | 3/2004 | Gotanda et al. | 293/155 |
| 6,764,118 | B2 | * | 7/2004 | DePottey et al. | 293/118 |

(Continued)

OTHER PUBLICATIONS

Vicroads,"Review of Truck Safety: Stage 1: Frontal, Side and Rear Underrun Protection", Monash University Accident Research Centre, Australia, Apr. 2002.

*Primary Examiner* — Kiran B Patel
(74) *Attorney, Agent, or Firm* — Ditthavong & Steiner, P.C.

(57) ABSTRACT

The present disclosure provides an apparatus, a system for a under-run protection device for a vehicle comprising a first beam member extending laterally to the direction of the vehicle, wherein a partial portion of the first beam has a corrugated cross-section. A second beam member mounted on the first beam member positioned and adapted to absorb an impact from another vehicle by deforming when the impact force exceeds a predetermined level, further the partial corrugated cross-section of the first beam member enables reduction in construction/manufacturing material for the said second beam member. A plurality of brackets characterized by a L-shape, joined to the first beam member at one arm of the L-shape and with the vehicle at other arm of the L-shape.

8 Claims, 12 Drawing Sheets

(56) References Cited

U.S. PATENT DOCUMENTS

| | | |
|---|---|---|
| 7,284,788 B1 | 10/2007 | Barbat et al. |
| 7,399,015 B2* | 7/2008 | Patel et al. .................. 293/133 |
| 7,950,705 B2 | 5/2011 | Saitou |
| 8,308,207 B2* | 11/2012 | Fang et al. .................. 293/132 |
| 2002/0149214 A1* | 10/2002 | Evans ........................ 293/120 |
| 2006/0119116 A1* | 6/2006 | Goertz ....................... 293/132 |
| 2008/0012364 A1* | 1/2008 | Boggess ..................... 293/120 |
| 2008/0185851 A1* | 8/2008 | Evans et al. ................ 293/120 |
| 2010/0109353 A1* | 5/2010 | Allen et al. ................. 293/120 |
| 2013/0113226 A1* | 5/2013 | Bobba et al. ................ 293/133 |

\* cited by examiner

SYSTEM, METHOD, AND APPARATUS FOR AUTOMOTIVE UNDER-RUN PROTECTIVE DEVICE

FIELD OF THE INVENTION

The present invention relates to energy and impact absorption system used in a vehicle, more particularly relates to an under run protection device used in vehicles to absorb impact and energy generated in an event.

BACKGROUND OF THE INVENTION

Use of under-run protection devices as an impact absorption apparatus is well known and well received in the field of body and chassis construction for trucks as a safety apparatus. They play an important role when a truck and a light motor vehicle are involved in a crash.

The ride height of a heavy vehicle is higher compared to a light motor vehicle (LMV), therefore, when involved in a crash with each other, the LMV under-runs the heavy vehicle, making the crash a high impact and fatal. The effect of light vehicle under running a heavy vehicle can be two fold.
1. Occupants of the light vehicle can be in direct contact with structural members of the heavy vehicle, and
2. The heavy vehicle, post impact may render uncontrollable leading to chain of crashes.

U.S. Pat. No. 7,399,015 issued to Patel, et al. discloses a tube like structure along with a plate that would protect in case of a crash. However, the new regulation introduced do not allow for tubular structures for under-run protection, due to the ineffectiveness in case of greater impact crash. The new regulation therefore mandates the face or the surface that is exposed to a vehicle involved in an accident as to be flat. Thus, making the granted patent obsolete for use under present regulations.

Though the prior arts in the field meet the standards set by various regulating bodies around the world there is a need to reduce the amount of material being used to manufacture the under-run protection devices (UPD) without changing impact absorbing capacity.

OBJECTIVE OF THE INVENTION

The principal objective of the present invention is to provide an improved energy absorbing structure for heavy vehicles.

Another objective of the invention is to simplify the manufacturing process for an improved energy absorbing structure by reducing the complexity of the component design using an automated designing method wherein only three inputs value help compute all the desired set of dimensions.

Yet another objective of the invention is to provide an improved energy absorbing structure for heavy vehicles with reduced weight and manufacturing method that enables to achieve reduction in weight.

SUMMARY OF THE INVENTION

Before the present methods and apparatuses are described, it is to be understood that this invention is not limited to the particular apparatus and methodologies described for an under-run protection device, as there can be multiple possible embodiments of the under run protection device, which are not expressly illustrated, in the present disclosure. It is also to be understood that the terminology used in the description is for the purpose of describing the particular versions or embodiments only, and is not intended to limit the scope of the under-run protection device, which will be limited only by the appended claims.

In the highly competitive market of commercial vehicles, for an original equipment manufacturer (OEM) to be profitable, the pricing of product should be very competitive. One such product addressed in the present application is the Under-run Protection Device used in vehicles.

In one aspect, a cost effective Under-run Protection Device is designed, contributing the product to be competitive.

The another aspect of the present disclosure, a novel under-run protection device is disclosed, the simple design of the under-run protection device gives a noteworthy cost savings due to manufacturing and weight reduction. The under-run protection device for a vehicle, comprises a first beam member (100) extending in a lateral direction of the vehicle comprising at least two distinguishable portions (110, 120), positioned adjacent to each other, wherein the first portion (110) has a corrugated cross-section and the second portion (120) has a "C" cross-section. A second beam member (210) is mounted on the first beam member (100), extending in the lateral direction is adapted to absorb an impact from another vehicle. Further a plurality of L-shape brackets (300) are mounted on the first beam (100), connecting the said first beam member (100) with the vehicle.

In another aspect of the invention, a system is provided comprising an energy absorbing structure with reduced weight. The energy absorbing structure with reduced weight for a vehicle comprises a first beam (405) member extending laterally to the direction of the vehicle, wherein a partial portion (420, 435) of the first beam has a corrugated cross-section. A second beam member (415) is mounted on the first beam member positioned and adapted to absorb an impact from another vehicle by deforming when the impact force exceeds a predetermined level, further the partial corrugated cross-section (420, 435) of the first beam member (405) enables reduction in construction/manufacturing material for the said second beam member. A plurality of brackets (440) characterized by a L-shape, are joined to the first beam member (405) at one arm of the L-shape and with the vehicle at other arm of the L-shape.

In another aspect of the invention, an energy-absorbing under-run protection system is provided, that minimizes the damage and improves the safety of vehicle occupants in a collision where a heavy vehicle and light motor vehicle are involved. The energy-absorbing under-run protection device is characterized by a partial corrugated first beam comprising: a second beam mounted on the first beam, wherein the said second beam is adapted to deform when an impact force exerted by another vehicle exceeds a predefined value; and a plurality of L-shape brackets are mounted in the trough of the corrugated first beam at one arm of the L-shape.

Yet in another aspect of the invention, a method for manufacturing an improved energy absorbing structure, having a set of dimensions computed based in inputs of only three values is disclosed. The set of dimensions are computed automatically without any trial and error approach. The set of dimension computed confer to standard requirement of various governing bodies. The use of said method reduces the cost of development for an under-run protection device and enables fast re-designing of the UPD as per requirement.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and product disclosed in the drawings.

DESCRIPTION OF THE INVENTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.
Definitions of the Terms:

The term vehicle refers to at least one element that can be selected from the group comprising of motor vehicle, automobile, personal transport vehicle, Automated guided vehicle, or self-propelled machines.

The terms "system," "systems," "components" or "parts" refers to a common term "systems" and essentially mean the same.

The terms "smart energy absorbing system (SEAS)," "under-run protection device," energy absorbing structure," or "(UPD)," refers to a common term "under-run protection device" and essentially mean the same.

Figure 1:
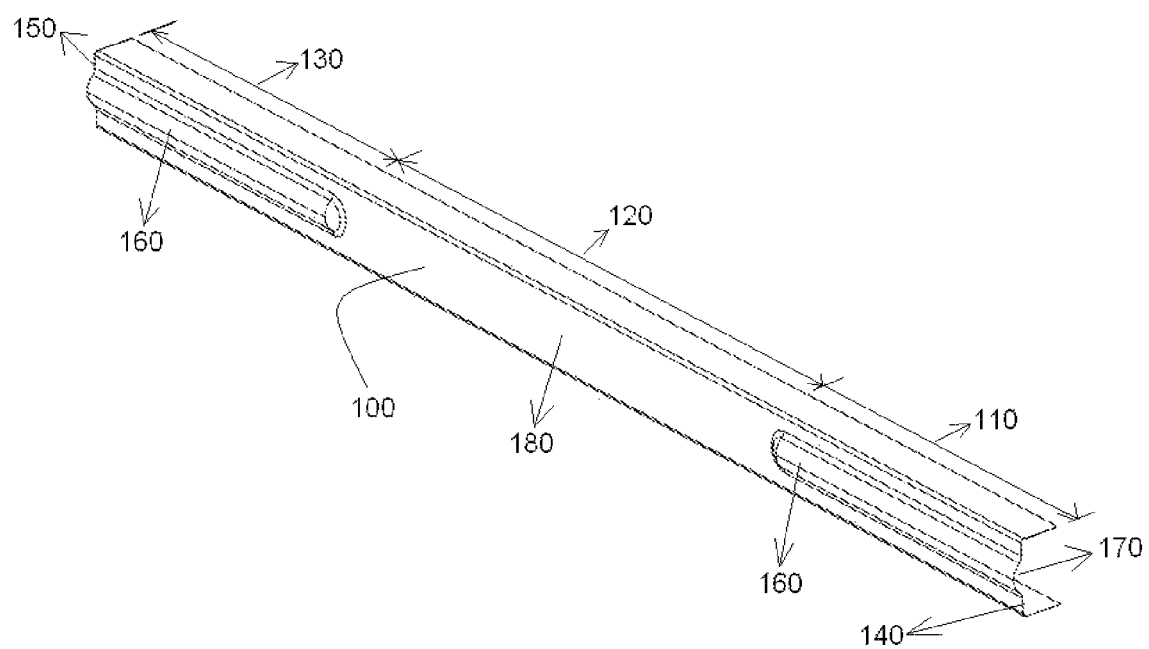
FIG. 1 is an isometric view of the corrugated under-run protection device according to an embodiment.

FIG. 1 illustrates an isometric view of the present disclosure according to an embodiment. The FIG. 1 shows a beam (100) having a corrugated cross-section. The beam (100) has three distinct parts, a part A (110), a part B (120), and a part C (130) between a first edge (140) and a second edge (150) of the beam (100). In the present embodiment the part A (110) has at least one crest (160) and at least one trough (170), such that the crest (160) is visible on a first side (180) facing the vehicle on which the under-run protection device would be mounted. The part B (120) has a C cross-section that extends up to the part C (130). The remaining beam that is the part B (120) has a corrugated structure wherein the at least one crest (160) is visible on a first side (180) facing the vehicle. The part C (130) is a mirror image of part A (110). The length of the at least one crest (160) is directly proportional to the length of the part A (110).

Figure 2:
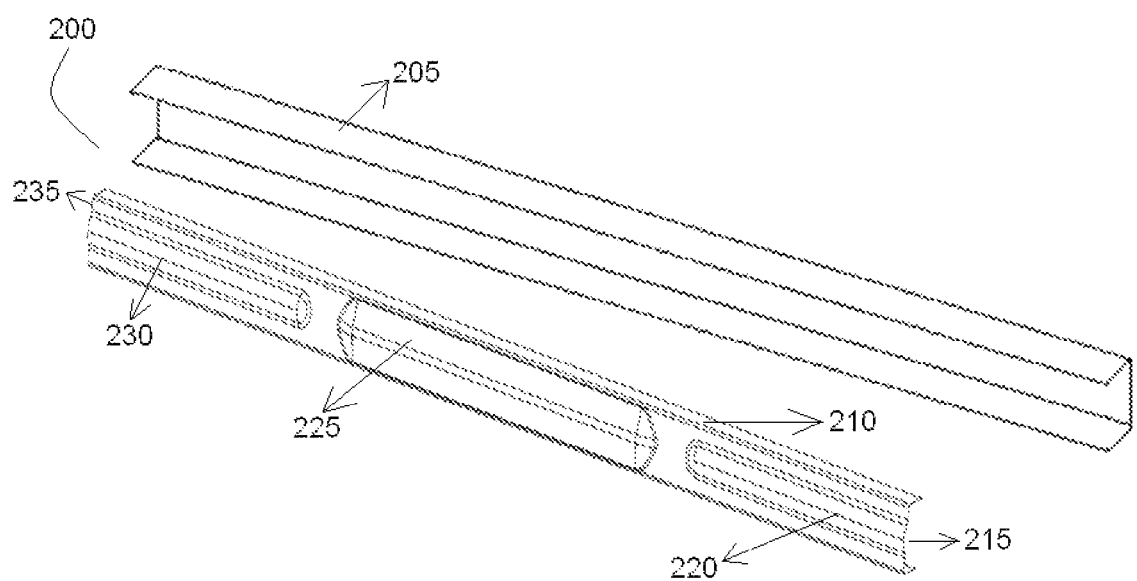
FIG. 2 is an isometric view of the corrugated under-run protection device according to another embodiment.

The FIG. 2 illustrates an isometric view of another embodiment of the present disclosure. The FIG. 2, shows an under-run protection device (200) comprising a first beam member (205) extending in a lateral direction of the vehicle and mounted on a second beam member (210). The first beam member (205) has a "C" cross-section and the second beam (210) has a corrugated cross-section. In an event of an under-run involving a second vehicle, the first beam is adapted to absorb an impact from the second vehicle. The under-run protection device (200) for the vehicle, wherein the first beam member (205) and the second beam (210) is configured to deform during the impact if the force exerted exceeds a threshold level. According to an embodiment the second beam (210) comprises a first portion (220) having at least one trough and at least one crest extending from a first edge (215) in the direction towards a center of the second beam (210). The second beam further comprises a second crest (225) extending on either side from the centre of the second beam (210). The length of the second crest (225) is determined by a distance between two parallel rails or members upon which the second beam (210) is mounted. The second beam (210) further comprises a second portion (230) having at least one another trough and at least one another crest extending from a second edge (235) towards the center of the second beam (210) having a predefined length.

In another embodiment of the present invention, the second beam (210) comprises a plurality of trough and a plurality of crest extending laterally over the entire length of the second beam (210).

Figure 3:
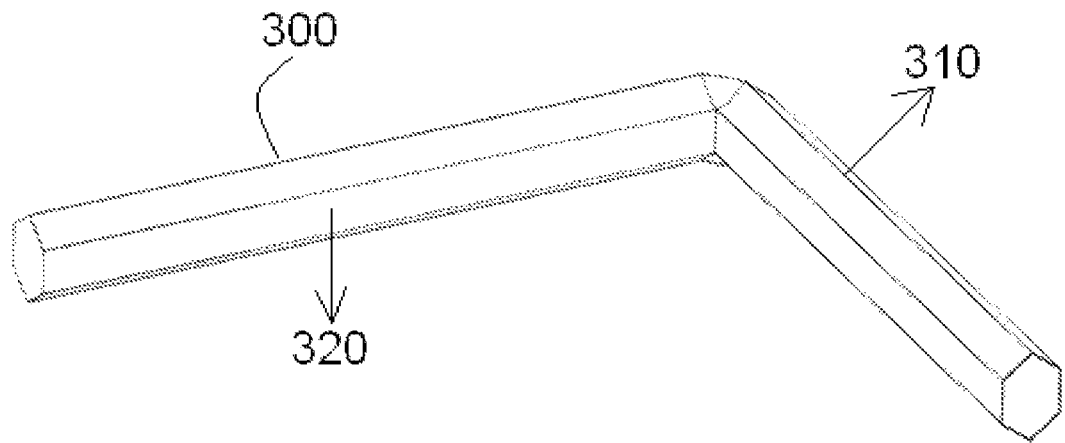
FIG. 3 is an isometric view of the L-shape bracket.

The FIG. 3 illustrates an isometric view of an L-shape bracket (300) from a plurality of L-shape bracket, which are mounted on a partial corrugated beam (Not Shown) in an embodiment, and on a complete corrugated first beam (Not Shown) in another embodiment. According to an exemplary embodiment, the L-shape bracket (300) is joined to the partial corrugated beam at one arm (310) of the L-shape bracket (300) and with the vehicle at other arm (320) of the L-shape. The L-shape bracket is designed and manufactured such that the L-shape bracket (300) starts to deform, in order to resist a displacement of 400 millimeter or more when absorbing an impact or force induced by another vehicle, during a collision. The L-shape bracket (300) has a Yield Limit of at least 255 megapascal (MPa). According to an embodiment, the length of the L-shape bracket (300) is directly proportional to a weight carrying capacity of the vehicle.

Figure 4:
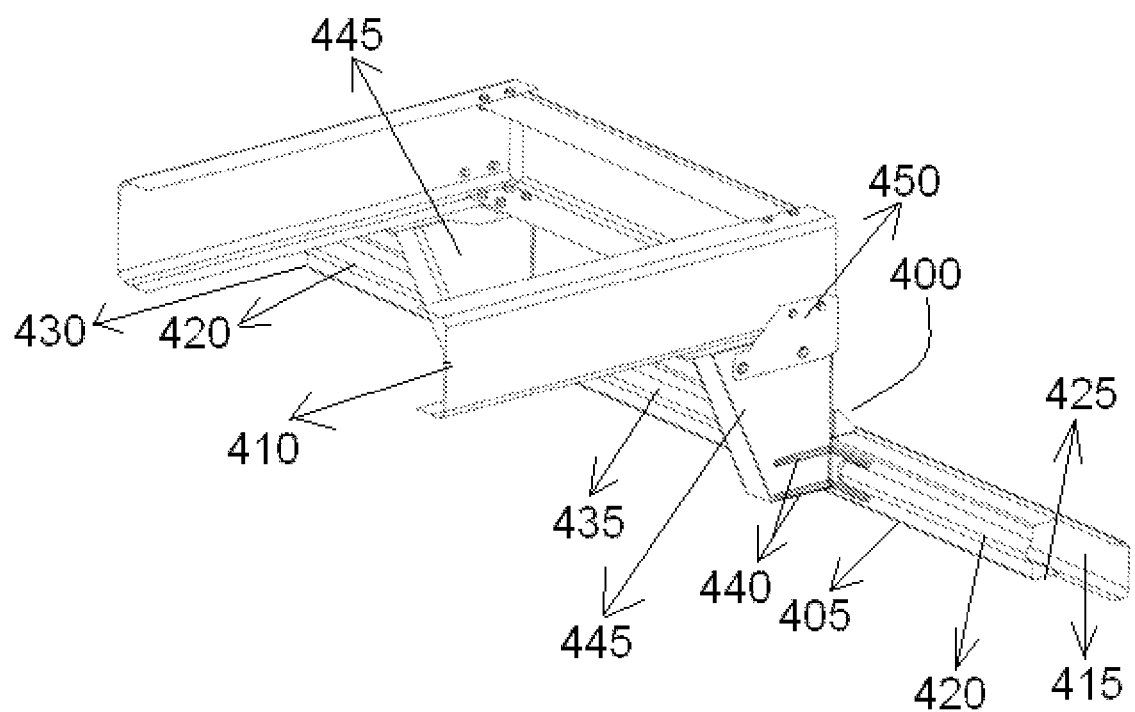
FIG. 4 is an isometric view of an assembly illustrating the corrugated under-run protection device and L-shape bracket mounted on a vehicle.

FIG. 4 illustrates an assembly of the under-run protection device (400) wherein a first beam member (405) extends laterally to the direction of a vehicle (410). The under-run protection device (400) comprises a second beam member (415) mounted via a welding to the first beam member (405). The combination of the first beam member (405) and the second beam member (415) is configured to deform when a load/force acting on the combination exceeds a threshold value. The threshold value is determined by a set of regulation issued by the transportation department or transport governing bodies of various countries. The first beam member (405)

comprises of a corrugated cross-section (420, 435). The corrugated cross section comprises of a plurality of crests and a plurality of troughs.

According to another embodiment, the corrugated cross section extends the entire length of the first member with the plurality of crests and the plurality of troughs having uniform size.

According to another embodiment, the corrugated cross section extends to a predefined length with varying sizes of crest and trough. For example, as illustrated in the FIG. 4 the first beam member has a first corrugated cross-section (420) that extends to predefined length from a first end (425) and a second end (430), towards the centre of the first beam (405). Further, a second corrugated cross-section (435) which extends to a predefined length from the centre of the first beam (405) towards the first end (425) and the second end (430). According to the embodiment illustrated in the FIG. 4, a plurality of L-shape brackets (440) are used to mount the first beam (405) on at least two vertical members (445). The vertical member is riveted to the vehicle (410) via a connecting bracket (450). The corrugated cross-section of the first beam member (405) enables reduction in construction/manufacturing material for the said first beam member.

According to an embodiment, the under-run protection device (400) wherein the plurality of L-shape bracket (440) is welded in the plurality of trough on a side facing the vehicle (410).

Figure 5:
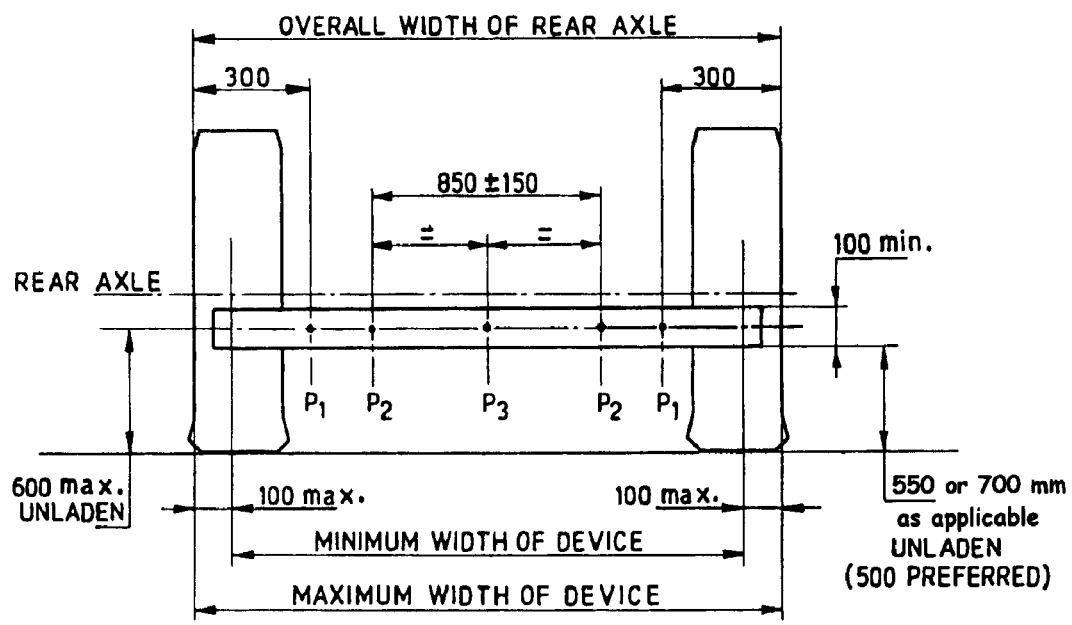
FIG. 5 illustrates a standard test requirement for Under-run protection device.

The present disclosure would be appreciated best by a person skilled in the art when read in conjugation with the following experimental data performed using a standard procedure as required by various regulating bodies:

FIG. 5 illustrates a standard test requirement for under-run protection device to be passed by a regulating body. References "$P_1$," "$P_2$," and "$P_3$" show the location where the forces are applied by a ram on the under-run protection device to be tested. The maximum displacement/deflection allowed when force is applied, is 400 mm.

Figure 6:
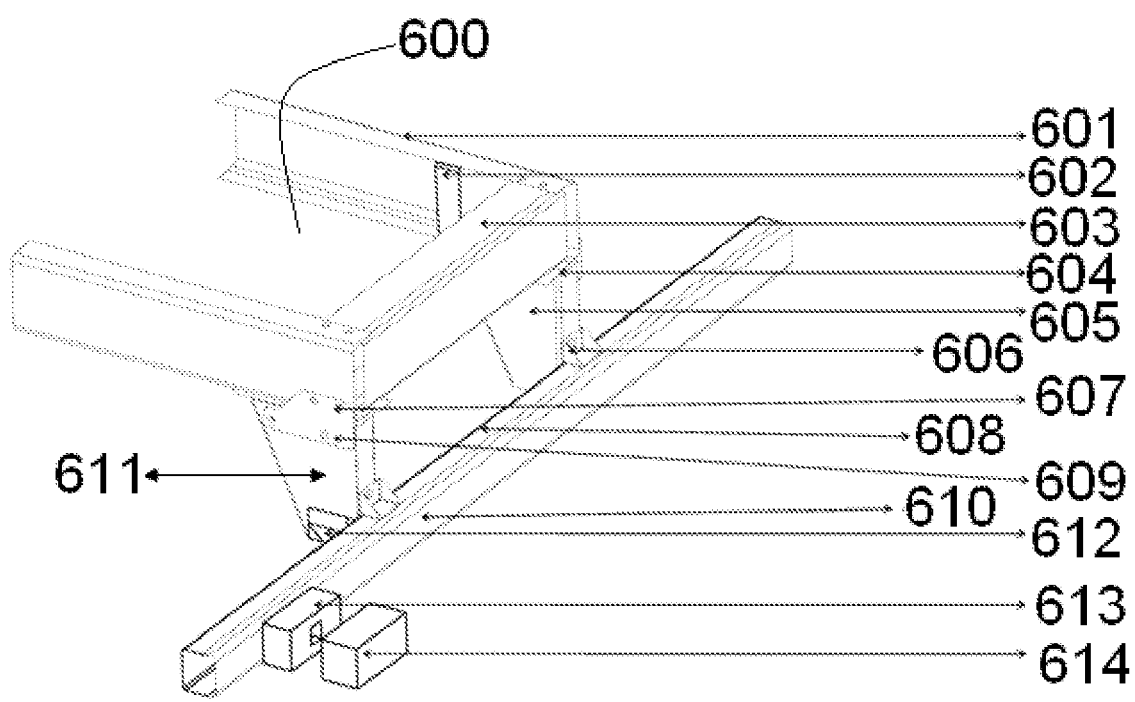
FIG. 6 illustrates a model is set up for testing.

FIG. 6 illustrates the way in which a model (600) is set up for testing; at least two long members (601) constrained at all the degrees of freedom and parallel to each other. A plurality of long member support brackets (602) are mounted on the at least two long members (601). The model (600) further comprises of a cross-member (603) positioned between each of the at least two long member (601). A base plate (604) is placed between the cross-member (603) and a main under-run protection device (UPD) bracket (605). The model further comprises of a rear under-run protection device (UPD) beam (608) mounted on the main under-run protection device (UPD) bracket (605) via a front support bracket (606). A connecting bracket (609) connects the main under-run protection device (UPD) bracket (605) with the at least two long members (601) via at least one bolt (607). A front under-run protection device (UPD) beam (610) is adapted to deform when a load acting on the front under-run protection device (UPD) beam (610) exceeds a threshold limit. The front under-run protection device (UPD) beam (610) is mounted on the rear under-run protection device (UPD) beam (608). The model (600) further comprises at least one supporting plate (611). A side support bracket (612) is mounted between the at least one supporting plate (611) and a rear side of the rear under-run protection device (UPD) beam (608). A RAM (613) and a pusher block (614) are mounted on the front under-run protection device (UPD) beam (610). The pusher block (614) is constrained at all degree of freedom except for translational direction. The Table A, shown below provides the reference number with respect to the FIG. 6 and details of the components shown in model set-up:

TABLE A

| Reference. No. | Part Name | Material | Thickness |
|---|---|---|---|
| 1. | Long Member | Bsk 46 | 7 mm |
| 2. | Long member support bracket | Bsk 46 | 5 mm |
| 3. | Cross member | FE 410 | 5 mm |
| 4. | Base Plate for main UPD bracket | FE 410 | 7 mm |
| 5. | Main UPD bracket | FE 410 | 4 mm |
| 6. | Front Support bracket | FE 410 | 5 mm |
| 7. | Bolts | Gr 8.8/10.9 | — |
| 8. | Rear UPD beam | Bsk 46 | 3.15 mm |
| 9. | Connecting bracket | FE 410 | 7 mm |
| 10. | Front UPD beam | Bsk 46 | 3.15 mm |
| 11. | Supporting plate to Main UPD bracket | FE 410 | 4 mm |
| 12. | Side Support bracket | FE 410 | 5 mm |
| 13. | RAM | CI | — |
| 14. | Pusher Block | CI | — |

Figure 7:
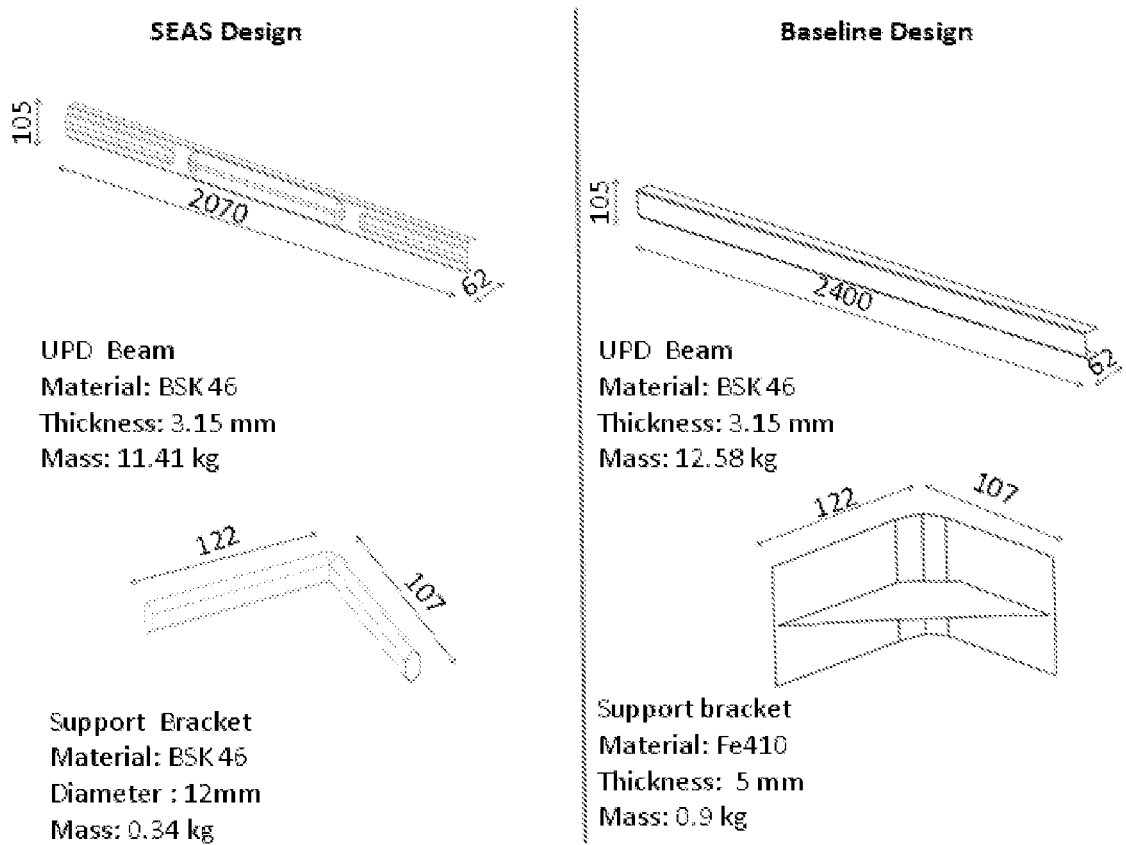
FIG. 7 illustrates an embodiment of the present disclosure under a standard test setup.

The FIG. 7, illustrates an embodiment of the present disclosure referred by (700) and the conventional design (710) tested under standard stress and strain experimentation. The baseline design or the conventional design is used as a control system.

Figure 9:
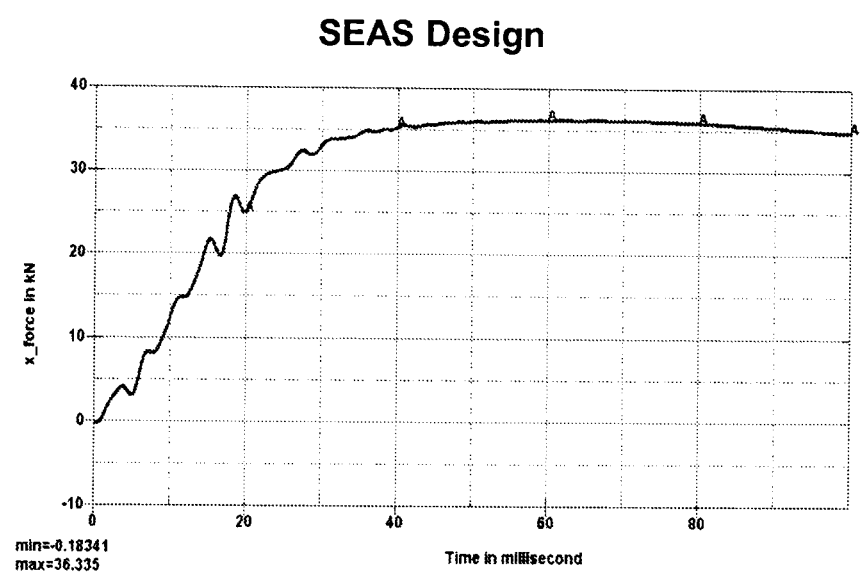
FIG. 9 shows a graph of the results of a load or force applied to the setup model at point P1.

When a load or force is applied to the setup model at point $P_1$, the results were captured in the form of a graph shown as FIG. 9.

Figure 10:
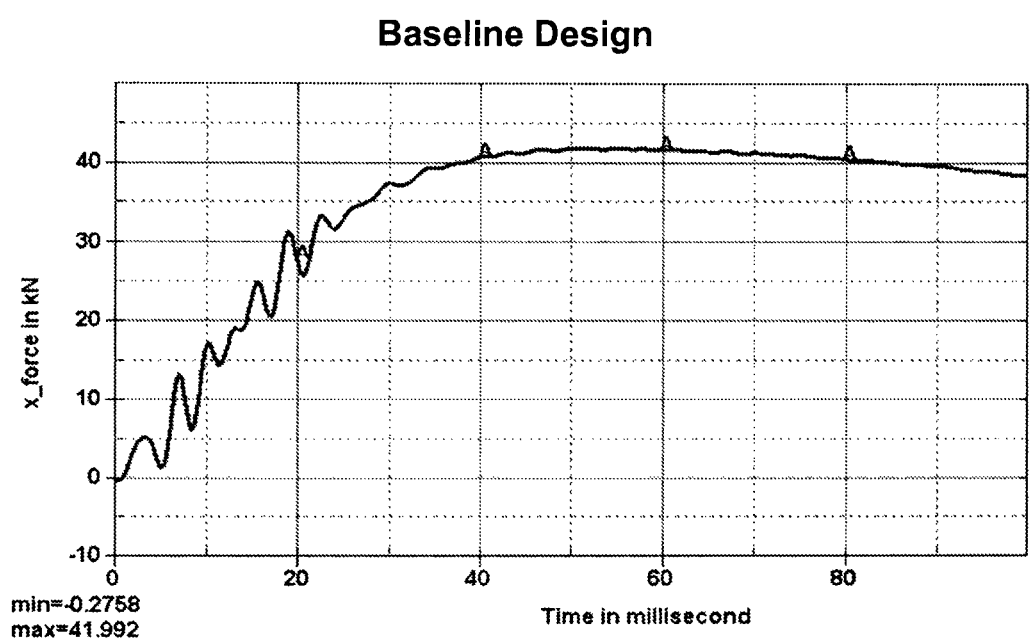
FIG. 10 shows a graph of the results of a load or force applied to the baseline design/conventional design at point P1.

FIG. 10 shows the test result when a baseline design/conventional design is subjected to similar test conditions.

It was observed from FIG. 9 and FIG. 10, that the claimed invention had achieved a 10% overload at 27.5 kilo Newton (kN) before failure compared to a conventional design at the same force.

Figure 11:
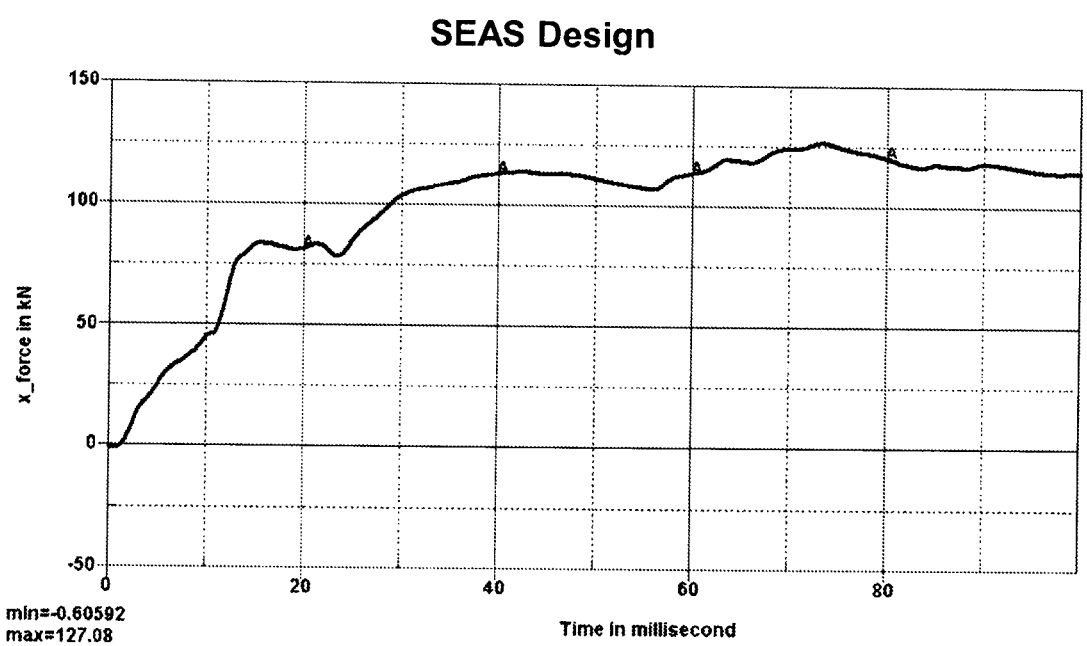
FIG. 11 shows a graph of the results of a load or force applied to the setup model at point P2.
Figure 12:
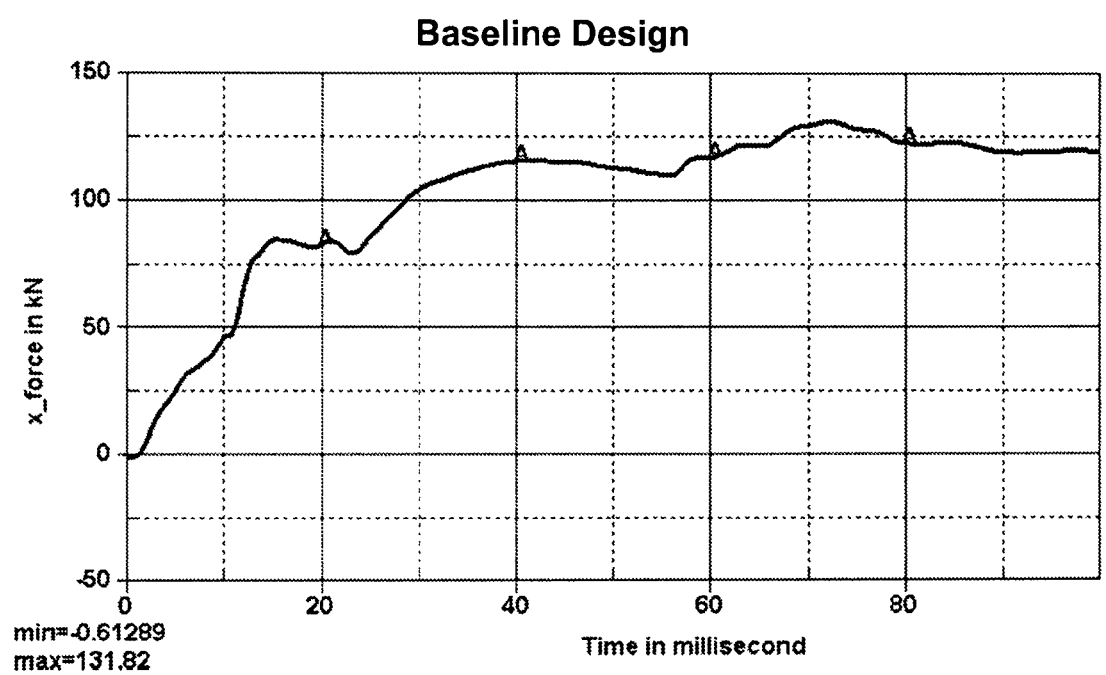
FIG. 12 shows a graph of the results of a load or force applied to the baseline design/conventional design at point P2.

When the load or force was applied at the location "$P_2$" to the claimed invention and conventional design it was observed that the claimed invention achieved a 10% overload at 110 kN compared to the conventional design at the same load, this is represented in FIG. 11 and FIG. 12.

The Table B, illustrated below shows the economical advantage of using the system and apparatus disclosed in the present application.

TABLE B

| Sr. No | Part List | Design | Weight (Kg) | Cost in Rs/ Part @ Rs. 48/Kg | Cost in Crore Rupees per Lakh Vehicle Sold |
|---|---|---|---|---|---|
| 1. | Rear UPD Beam | Baseline | 12.582 | 604.0 | 6.03 |
| 2. | Rear UPD Beam | SEAS | 11.141 | 535.0 | 5.34 |
| 3. | UPD Side Bracket | Baseline | 1.797 | 86.0 | 0.86 |
| 4. | UPD Side Bracket | SEAS | 0.667 | 32.0 | 0.32 |
| Cost advantage for UPD Beam: (1) − (2): 6.03 −5.34 = 0.69 Cr | | | | | |
| Cost advantage for UPD side bracket: (3) − (4): 0.86 − 0.32 = 0.54 Cr | | | | | |
| Total Cost Saving: 0.69 + 0.54 = 1.23 Cr | | | | | |

Figure 8:
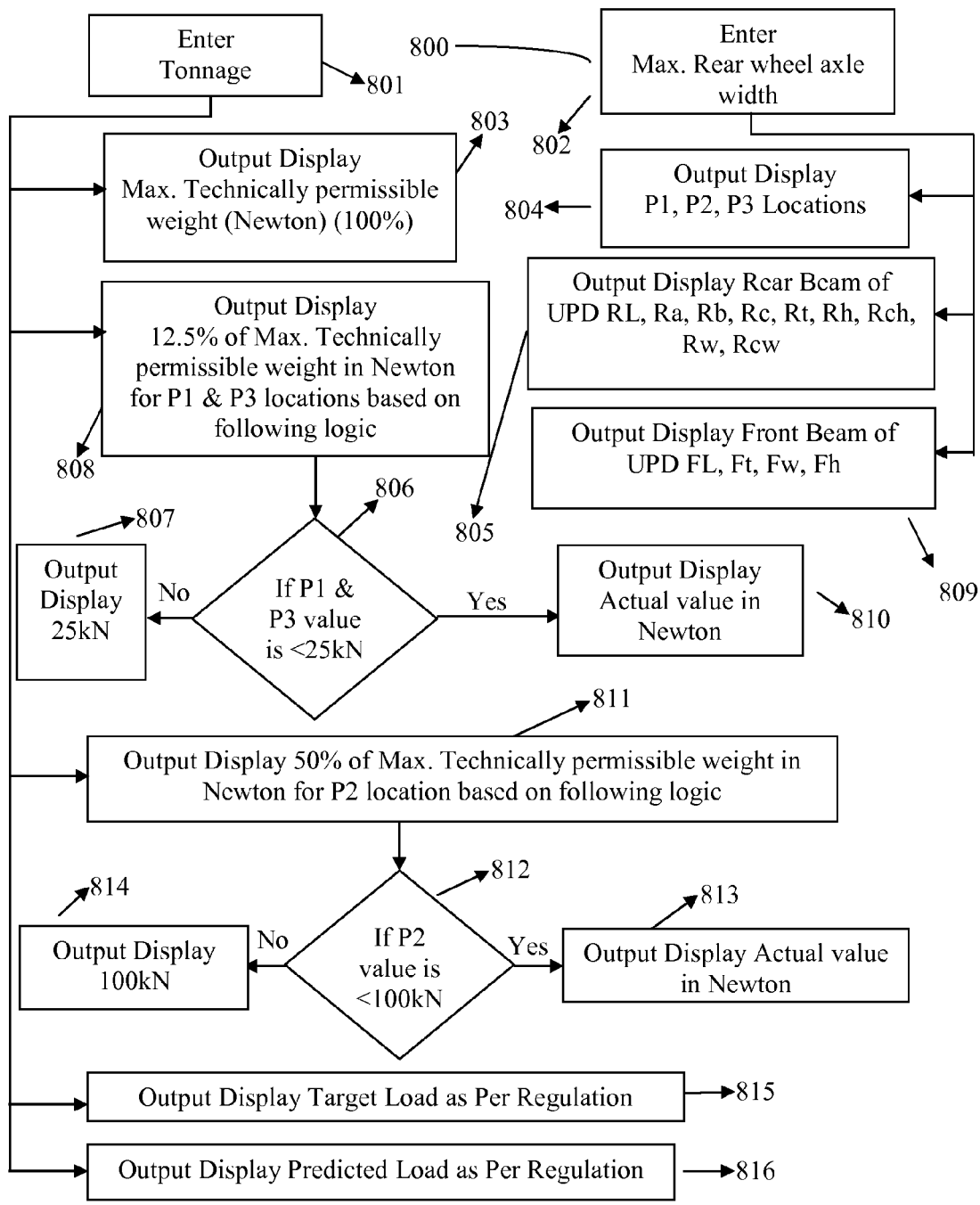
FIG. 8 shows a flow chart according to an embodiment, illustrating steps involved in designing an under-run protection device.

FIG. 8 shows a flow chart according to an embodiment, illustrating steps involved in designing an under-run protection device. The process for designing (800) an under-run protection device involves input from a user wherein the user enters only three parameters that are a maximum rear wheel axle width (802) across a vehicle, that is perpendicular to the motion of the vehicle, a desired weight of the vehicle (801) and a type of material to be used. Based upon the variables entered by a user that is after determining the maximum length of a wheel axle and weight of vehicle a first set of dimension and a second set of dimension are calculated. The first set of dimension is associated with a corrugated beam and the second set of dimension is associated with a second beam having a "C" cross-section. Utilizing the maximum rear wheel axle width position of "$P_1$," "$P_2$," and "$P_3$" are determined (804). Positions "$P_1$," "$P_2$," and "$P_3$" illustrates the location where force or a load would act on the assembly of the corrugated beam with the secondary beam. Further, the first set of dimension (805) comprises of length of the corrugated beam, length of a plurality of crest, length of a plurality of trough, width of the plurality of crest, width of the plurality of the trough, width of the corrugated beam, thickness of the corrugated beam, height of the corrugated beam, height of the plurality of the crest. The second set of dimension (809) comprises of length of the second beam, width of the second beam, height of the second beam, thickness of the second beam.

According to the present embodiment, a maximum allowable weight (803) for the vehicle would depend on the weight of the vehicle (801). The process further comprises step of computing and displaying the permissible weight or load or force acting at positions "P1," and "P3". When the permissible force that can be exerted on location "P1" and "P3" exceeds 25 kilo Newton (kN) then only 25 kN is rendered (807) and when it's below 25 kN then the actual permissible force is rendered (810). For position "P2" when permissible force exceeds 100 kilo Newton (kN) then only 100 kN is rendered (814) and when its below 100 kN then the actual permissible force is rendered (813). According to an embodiment "P1" and "P3" are computed as 12.5% of the maximum allowable weight (803) and "P2" is computed as 50% of the maximum allowable weight (803). The flow chart illustrating the designing on the under-run protection device further comprises of rendering the target load as per the regulation (815) of various governing bodies and predicted load (816).

The invention claimed is:

1. A under-run protection device system for a vehicle comprising:
   a first beam member extending laterally to the direction of a vehicle wherein a partial portion of the first beam member has a corrugated cross-section;
   a second beam member mounted on the first beam member positioned and adapted to absorb an impact from another vehicle by deforming when the impact force exceeds a threshold value, further the partial corrugated cross-section of the first beam member enables reduction in construction/manufacturing material for the said second beam member; and
   a plurality of L-shaped brackets, wherein a one arm of the L-shape of each of the plurality of L-shaped brackets is joined to the first beam member, wherein an other arm of the L-shape of each of the plurality of L-shaped brackets is joined to a vertical member, wherein vertical member is riveted to the vehicle via a connecting bracket, wherein the one arm of the L-shape is parallel to the first beam member, wherein the other arm of the L-shape is perpendicular to the first beam member, and wherein the one arm of each of the plurality of L-shaped brackets is welded in the trough of the first beam member having corrugated cross-section.

2. The under-run protection device system for a vehicle of claim 1, wherein the length of the plurality of L-shape bracket is directly proportional to a weight carrying capacity of the vehicle.

3. The under-run protection device system for a vehicle of claim 1, wherein a displacement of at least 400 millimeter by the first beam member is resisted by the plurality L-shaped bracket.

4. The under-run protection device system for a vehicle of claim 1, wherein the partial corrugated first beam member has a Yield Limit of at least 255 mega Pascal (MPa).

5. The under-run protection device system for a vehicle of claim 1, the second beam member is mounted on the first beam member via a welding to the first beam member.

6. The under-run protection device system for a vehicle of claim 1, the threshold value is determined by a set of regulation issued by the transportation department or transport governing bodies of a country.

7. The under-run protection device system for a vehicle of claim 1, the partial corrugated cross-section comprises of a plurality of crests and a plurality of troughs.

8. The under-run protection device system for a vehicle of claim 7, the plurality of crests and the plurality of troughs have a uniform size.

* * * * *